United States Patent
Kim (10) Patent No.: US 9,322,469 B2
(45) Date of Patent: Apr. 26, 2016

(54) FOLDING FAN TYPE ELECTRONIC SHIFT LEVER

(71) Applicant: Hyundai Motor Company, Seoul (KR)

(72) Inventor: Eun-Sik Kim, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/549,240

(22) Filed: Nov. 20, 2014

(65) Prior Publication Data
US 2015/0276048 A1    Oct. 1, 2015

(51) Int. Cl.
| | | |
|---|---|---|
| F16H 59/08 | (2006.01) | |
| B60K 20/02 | (2006.01) | |
| B60Q 3/04 | (2006.01) | |
| F16H 59/02 | (2006.01) | |

(52) U.S. Cl.
CPC ............... *F16H 59/08* (2013.01); *B60K 20/02* (2013.01); *F16H 2059/026* (2013.01); *F16H 2059/081* (2013.01); *Y10T 74/2014* (2015.01)

(58) Field of Classification Search
CPC ....... F16H 59/02; F16H 59/044; F16H 59/08; F16H 59/12; F16H 59/105; F16H 59/0217; F16H 59/0204; F16H 59/081; B60K 20/02; B60K 20/08; B60Q 1/05; B60Q 3/001; B60Q 3/0266; B60Q 3/04; B60Q 3/002; B60Q 3/042; B60Q 37/06
See application file for complete search history.

(56) References Cited

U.S. PATENT DOCUMENTS

| | | | | | |
|---|---|---|---|---|---|
| 1,656,385 | A | * | 1/1928 | Morse | B60Q 1/34 116/41 |
| 1,659,466 | A | * | 2/1928 | Hendricks | B60Q 1/34 116/41 |
| 1,728,467 | A | * | 9/1929 | Beidler | B60Q 1/34 116/41 |
| 1,969,144 | A | * | 8/1934 | Mozur | B60Q 1/34 116/41 |
| 2,933,945 | A | * | 4/1960 | Brewster | F16H 59/12 74/10.27 |
| 2,936,349 | A | * | 5/1960 | Johnson | H01H 9/063 200/50.02 |
| 3,266,151 | A | * | 8/1966 | Berent | G04B 49/02 116/41 |
| 3,791,336 | A | * | 2/1974 | Zdebski | B60Q 7/005 116/28 R |
| 5,528,953 | A | | 6/1996 | Steinle et al. | |
| 9,021,913 | B2 | * | 5/2015 | Kamoshida | F16H 59/08 74/473.3 |
| 2013/0047768 | A1 | * | 2/2013 | Kamoshida | F16H 59/08 74/473.3 |
| 2013/0269463 | A1 | | 10/2013 | Lindner et al. | |

* cited by examiner

*Primary Examiner* — David M Fenstermacher
*Assistant Examiner* — Jude Agendia
(74) *Attorney, Agent, or Firm* — Morgan, Lewis & Bockius LLP (57) ABSTRACT

A folding fan type electronic shift lever may include a plurality of gear shift units disposed on a console surface of a vehicle, a console fixing pin penetrating a hole formed at a side of each of the plurality of gear shift units, an operating unit connected to one or more gear shift units of the plurality of gear shift units, and operated to allow the plurality of gear shift units to be rotated about the console fixing pin, and a control unit disposed on a lower portion of the console surface of the vehicle, receiving operational signals sent from the plurality of gear shift units through the console fixing pin, and transmitting the operational signals to a transmission control unit (TCU) of the vehicle.

8 Claims, 7 Drawing Sheets

FOLDING FAN TYPE ELECTRONIC SHIFT LEVER

CROSS-REFERENCE TO RELATED APPLICATIONS

The present application claims priority to Korean Patent Application No. 10-2014-38438, filed Apr. 1, 2014, the entire contents of which is incorporated herein for all purposes by this reference.

BACKGROUND OF THE INVENTION

1. Field of the Invention

The present invention relates to an electronic shift lever, and more particularly, to a folding fan type electronic shift lever in which a plurality of gear shift units are rotated to the outside of a center fascia and spread when an operating button is operated, and the plurality of gear shift units are sequentially stacked and accommodated in the center fascia when the operation of the operating button is stopped.

2. Description of Related Art

In general, a transmission is an apparatus that transmits power generated by an engine to drive wheels while changing rotational force and speed depending on a driving state of a vehicle, and classified into a manual transmission and an automatic transmission.

A driver who drives the vehicle may manipulate a shift lever, which is mounted on a console surface at the periphery of a driver seat or mounted on a steering handle, so as to change a gear shift stage of the manual transmission or the automatic transmission to a desired gear shift stage.

The manual transmission is operated in a manner in which when the driver selects a gear, which is suitable for a driving state of the vehicle, using the shift lever, a movement desired by the driver is transmitted to the manual transmission through a cable or a rod. The automatic transmission is operated in a manner in which the driver drives an inhibitor switch through a cable by moving the shift lever so as to transmit a movement desired by the driver to the automatic transmission.

Particularly, recently, instead of a mechanical shift lever, usage of an electronic shift lever, which substitutes a mechanical connection structure between the transmission and the shift lever with an electrical connection structure using an actuator and an ECU is increased.

The electronic shift lever does not have a mechanical cable connection structure unlike the mechanical shift lever, and needs to have a position sensor unit that converts the driver's intention of shifting gears into an electronic signal, but there are advantages in that the driver may efficiently and conveniently manipulate the shift lever.

As the types of electronic shift levers, there are a lever type electronic shift lever which is operated in a manner in which an electronic shift lever protruding from a console surface of the vehicle is manipulated forward and rearward, a dial type electronic shift lever in which a cylindrical electronic shift lever mounted on the console surface of the vehicle is manipulated by being rotated clockwise and anti-clockwise, a column type electronic shift lever in which an electronic shift lever mounted at a side of the steering handle of the vehicle is manipulated upward and downward, and a button type electronic shift lever in which a button on which gear shift stages of the vehicle are indicated is manipulated by being pressed.

However, the lever type electronic shift lever in the related art has a problem in that a trajectory of rectilinear movement thereof is significantly long because the driver needs to move the entire arm in a front and rear direction or in a left and right direction while manipulating the lever type electronic shift lever, has no great advantage as the electronic shift lever in comparison with a mechanical shift lever because the lever type electronic shift lever is manipulated in a manner similar to a manipulation manner of the mechanical shift lever, and has a problem in that there is a risk that the driver's head may be injured by colliding with the shift lever at the time of a vehicle collision because the shift lever protrudes above the console surface.

When the dial type electronic shift lever in the related art is manipulated, a trajectory of rectilinear movement is hardly generated, but there is a problem in that stress is put on the driver's wrist and it is inconvenient for the driver to manipulate the dial type electronic shift lever because the driver manipulates the dial type electronic shift lever while rotating the wrist.

The column type electronic shift lever in the related art has an advantage in that a distance from the steering handle is short, but has a problem in that a dynamic trajectory thereof is significantly long because the driver needs to twist the driver's arm to manipulate the column type electronic shift lever.

The button type electronic shift lever in the related art has an advantage in that the button type electronic shift lever is manipulated conveniently and intuitively, but has a drawback in that all of a P-stage button, an R-stage button, an N-stage button, and a D-stage button need to be displayed within a limited space of the shift lever, and thus intervals between the buttons become short.

That is, when the driver presses a button in order to change the gear shift stage, two buttons are frequently pressed at the same time, and as a result, there is a problem in that traveling stability of the vehicle greatly deteriorates due to the aforementioned erroneous manipulation.

In a case in which intervals between the buttons are increased in order to prevent the aforementioned erroneous manipulation, a space occupied by the shift lever becomes excessively great, and as a result, there is a problem in that accommodating space or spaces for installing other buttons for performing specific functions are insufficient.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a folding fan type electronic shift lever in which a plurality of gear shift units is accommodated in a center fascia at ordinary times such that a large space in a console surface may be utilized, and the plurality of gear shift units is spread to the outside of the center fascia when a driver drives a vehicle such that the driver may easily manipulate the gear shift units in a large button region when changing the gear shift stage.

In an aspect of the present invention, a folding fan type electronic shift lever apparatus may include a plurality of gear shift units disposed on a console surface of a vehicle, and movable to an inside or an outside of a center fascia through an opening portion formed in the center fascia, a console fixing pin penetrating a hole formed at a side of each of the plurality of gear shift units to couple the plurality of gear shift units thereto, and fixedly installed on the console surface of the vehicle, an operating unit coupled to one or more gear shift units of the plurality of gear shift units, and operated by an operating button installed on the center fascia or the console surface of the vehicle to allow the plurality of gear shift units to be rotated about the console fixing pin, and a control unit being disposed on a side of the console surface of the vehicle, receiving operational signals sent from the plurality of gear shift units through the console fixing pin, and being configured to transmit the operational signals to a transmission control unit (TCU) of the vehicle, wherein the plurality of gear shift units are rotated to the outside of the center fascia and then spread when the operating button is operated, and the plurality of gear shift units are sequentially stacked and accommodated inside the center fascia when operation of the operating button is stopped.

The plurality of gear shift units may include a first gear shift unit, a second gear shift unit, a third gear shift unit, and a fourth gear shift unit, wherein a first lower protrusion is formed at a side of a lower portion of the first gear shift unit, a second lower protrusion is formed at a side of a lower portion of the second gear shift unit, a second upper protrusion, which is disposed to come into contact with the first lower protrusion, is formed at another side of an upper portion of the second gear shift unit, a third lower protrusion is formed at a side of a lower portion of the third gear shift unit, a third upper protrusion, which is disposed to come into contact with the second lower protrusion, is formed at another side of an upper portion of the third gear shift unit, and a fourth upper protrusion, which is disposed to come into contact with the third lower protrusion, is formed at a side of an upper portion of the fourth gear shift unit.

The operating unit may include a solenoid coupled to a rod that is moved forward and rearward as the operating button is operated or the operation of the operating button is stopped, and a rotary portion formed integrally with a side of the fourth gear shift unit, and having a slot formed therein, wherein an end of the rod is slidably accommodated in the slot of the rotary portion to rotate the fourth gear shift unit connected with the rotary portion, and the first, second and third gear shift units are rotated as the fourth gear shift unit is rotated.

The folding fan type electronic shift lever apparatus may further may include a console supporting pin vertically installed on the console surface inside the center fascia of the vehicle, and supporting the plurality of gear shift units, wherein the console supporting pin prevents the plurality of gear shift units from being spread to the inside of the center fascia when the plurality of gear shift units is accommodated in the center fascia.

The plurality of gear shift units may include first, second, third and fourth gear shift units, and the folding fan type electronic shift lever apparatus further may include a gear shift unit supporting pin vertically installed at a side of the fourth gear shift unit, and supporting the first, second, third and fourth gear shift units, and the gear shift unit supporting pin prevents the plurality of gear shift units from being spread to the outside of the center fascia when the plurality of gear shift units is accommodated in the center fascia.

A side of an upper portion of each of the plurality of gear shift units is formed as an inclined surface having a predetermined angle or a curved surface having a predetermined radius of curvature.

The predetermined angle of the inclined surface of each of the plurality of gear shift units is between approximately 20° and approximately 45°.

The predetermined radius of curvature of the curved surface of each of the plurality of gear shift units is one to two times as large as a thickness of each of the plurality of gear shift units.

According to the present invention having the aforementioned configurations, the plurality of gear shift units is sequentially stacked and accommodated in the center fascia at ordinary times, and the plurality of gear shift units is rotated to the outside of the center fascia and spread when the folding fan type electronic shift lever is operated, such that a larger accommodating space in the console surface may be utilized at ordinary times, and when the folding fan type electronic shift lever is operated, visibility of the gear shift stages may be improved, and erroneous manipulation may be prevented by using the plurality of gear shift units having a wide area.

When the operating button is operated to drive the vehicle, the plurality of gear shift units pops up while being spread, and as a result, the driver has fun while manipulating the gear shift stage, thereby remarkably improving marketability of the vehicle.

The electronic shift lever may be configured using a comparatively simple structure in comparison with the electronic shift lever in the related art, thereby simplifying a process of manufacturing the vehicle, and reducing production costs for the vehicle.

One side of the upper portion of each of the plurality of gear shift units is formed as an inclined surface having a predetermined angle or a curved surface having a predetermined radius of curvature, the driver may quickly and easily change the gear shift stage only by moving a finger upward or downward, thereby efficiently and conveniently manipulating the shift lever.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Terms or words used in the specification and the claims should not be interpreted as being limited to general and dictionary meanings and should be interpreted as having meanings and concepts which conform to the technical spirit of the present invention based on a principle that an inventor can appropriately define a concept of a term to describe his/her own invention in the best manner.

Figure 1:
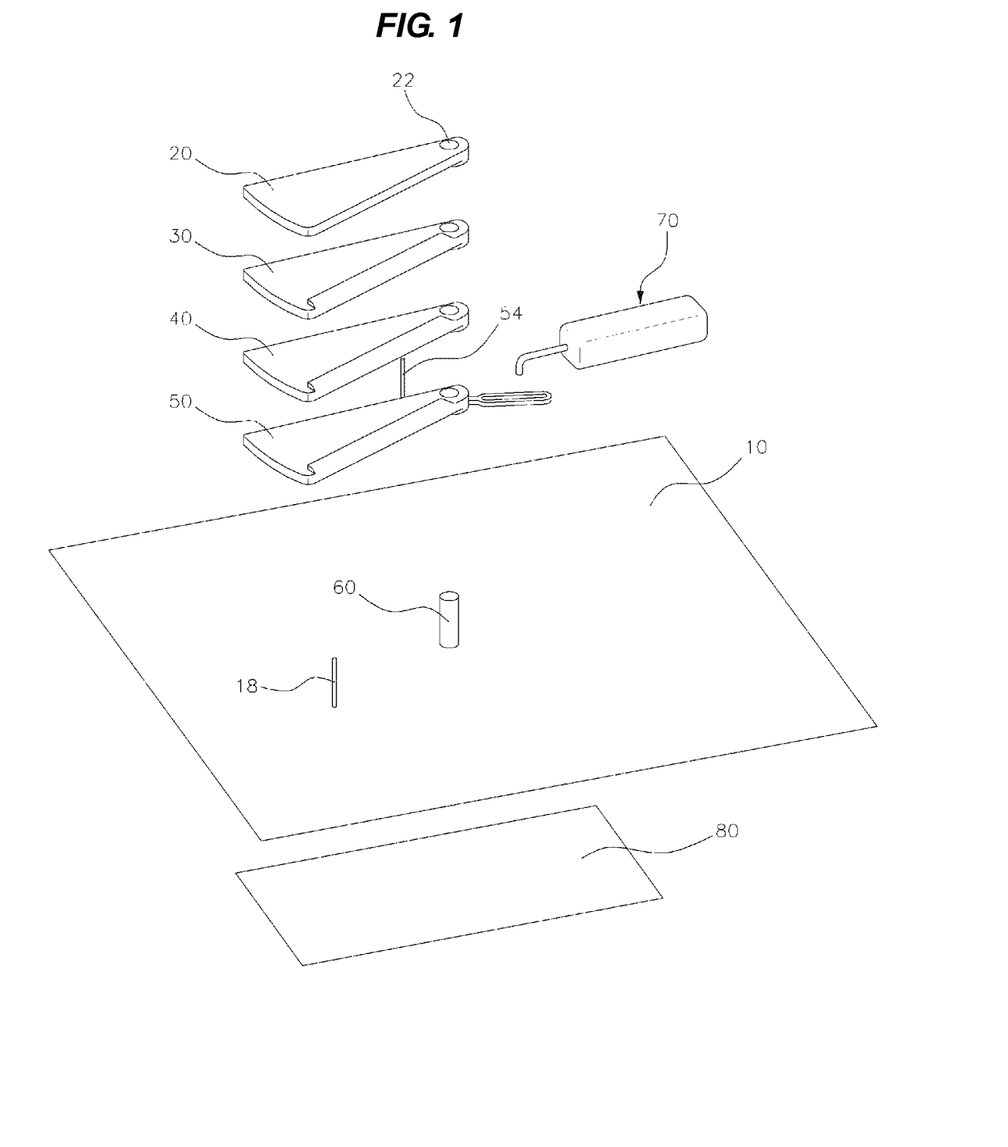
FIG. 1 is an exploded perspective view illustrating an appearance of an exemplary folding fan type electronic shift lever according to the present invention.
Figure 2A:
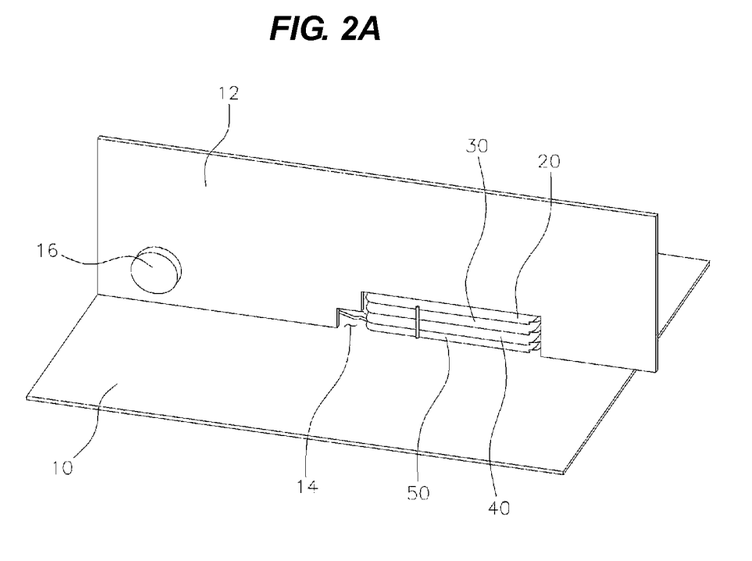
FIG. 2A is a perspective view illustrating an appearance in which the exemplary folding fan type electronic shift lever is accommodated in a center fascia according to the present invention.
Figure 2B:
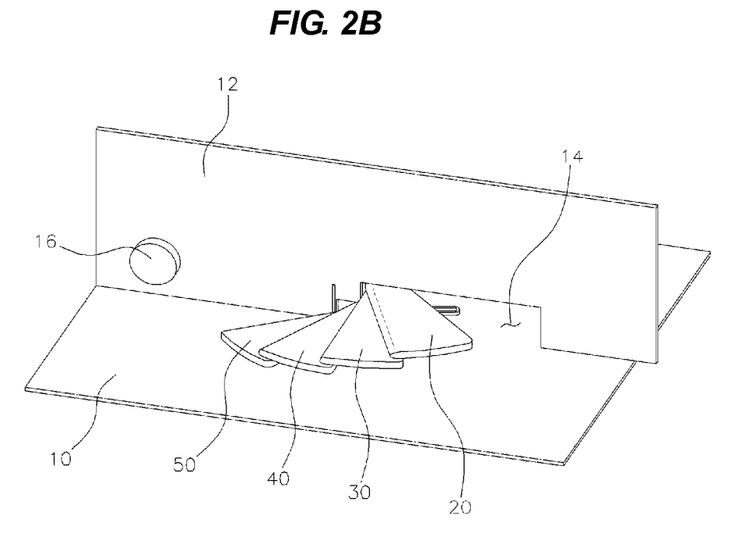
FIG. 2B is a perspective view illustrating an appearance in which the exemplary folding fan type electronic shift lever is spread outside the center fascia according to the present invention.

FIG. 1 is an exploded perspective view illustrating an appearance of a folding fan type electronic shift lever according to various embodiments of the present invention, FIG. 2A is a perspective view illustrating an appearance in which the folding fan type electronic shift lever according to various embodiments of the present invention is accommodated in a center fascia 12, and FIG. 2B is a perspective view illustrating an appearance in which the folding fan type electronic shift lever according to various embodiments of the present invention is spread outside the center fascia 12.

A folding fan type electronic shift lever of the present invention includes a plurality of gear shift units 20, 30, 40, and 50 which are disposed on a console surface 10 of a vehicle, and are movable to an inside or an outside of the center fascia 12 through an opening portion 14 formed in the center fascia 12, a console fixing pin 60 which penetrates a hole 22 formed at one side of each of the plurality of gear shift units, and is fixedly installed on the console surface 10 of the vehicle, an operating unit 70 which is connected to one or more gear shift units of the plurality of gear shift units, and operated by an operating button 16 installed on the center fascia 12 or the console surface 10 of the vehicle so as to allow the plurality of gear shift units to be rotated about the console fixing pin 60, and a control unit 80 which is disposed on a lower portion of the console surface 10 of the vehicle, receives operational signals sent from the plurality of gear shift units through the console fixing pin 60, and transmits the operational signals to a transmission control unit (TCU) of the vehicle.

The console surface 10 of the vehicle is installed in a flat box shape so as to protect the shift lever from dust or impact, and may be installed at various locations such as a space between a driver seat and a front passenger seat as necessary.

The console surface 10 may have a space in which the shift lever may be disposed, and may also have various accommodating spaces, which are formed in a vacant space of the console surface 10, such as a cup holder in order to provide convenience for the driver.

The center fascia 12, on which various types of buttons such as a frequency adjustment button or a volume adjustment button of a radio, operation and adjustment buttons for an air conditioner for cooling and heating the interior of the vehicle, and buttons for operating heating seats mounted in the driver seat and the front passenger seat are disposed so as to improve the convenience in driving the vehicle, is formed between the driver seat and the front passenger seat of the vehicle.

An end of the console surface 10 and a lower end of the center fascia 12 are in contact with each other so as to form an approximately predetermined angle (for example,) 90°, and the folding fan type electronic shift lever according to the exemplary embodiment of the present invention is disposed at a portion where the console surface 10 and the center fascia 12 are in contact with each other as described above.

In various embodiments, the gear shift units, which serve as a gear shift button of an electronic shift lever, includes a first gear shift unit 20, a second gear shift unit 30, a third gear shift unit 40, and a fourth gear shift unit 50, and are configured to be movable to the inside or the outside of the center fascia 12 through the opening portion 14 formed in the center fascia 12.

Specifically, the second gear shift unit 30 is disposed below the first gear shift unit 20, the third gear shift unit 40 is disposed below the second gear shift unit 30, and the fourth gear shift unit 50 is disposed below the third gear shift unit 40.

The first gear shift unit 20 is a button that may change a gear shift stage of the vehicle to a P-stage, the second gear shift unit 30 is a button that may change the gear shift stage of the vehicle to an R-stage, the third gear shift unit 40 is a button that may change the gear shift stage of the vehicle to an N-stage, and the fourth gear shift unit 50 is a button that may change the gear shift stage of the vehicle to a D-stage.

Each of the first gear shift unit 20, the second gear shift unit 30, the third gear shift unit 40, and the fourth gear shift unit 50 has therein a corresponding sensor and coil unit that may generate magnetic flux, and is operated in a touch manner, and operational signals generated by the first gear shift unit 20, the second gear shift unit 30, the third gear shift unit 40, and the fourth gear shift unit 50 are transmitted to the control unit 80 that will be described below.

Four gear shift units are provided in the folding fan type electronic shift lever according to various embodiments of the present invention, but there may be various configurations in accordance with the type of vehicle such as a configuration in which the P-stage gear shift unit is configured as a separate button, and three gear shift units (the R-stage gear shift unit, the N-stage gear shift unit, and the D-stage gear shift unit) are provided, a configuration in which an M-stage gear shift unit is additionally provided, and a '+'-stage gear shift unit and a '−'-stage gear shift unit are configured as separate buttons, such that five gear shift units (the P-stage gear shift unit, the R-stage gear shift unit, the N-stage gear shift unit, the D-stage gear shift unit, and the M-stage gear shift unit) are provided, and a configuration in which the '+'-stage gear shift unit, and the '−'-stage gear shift unit are additionally provided such that seven gear shift units are provided.

Each of the four gear shift units 20, 30, 40 and 50 may be formed in various shapes such as a triangular plate shape, or a rectangular plate shape in consideration of the interior of the vehicle, and in various embodiments, gear shift units 20, 30, 40 and 50 are formed in a folding fan type plate shape.

As illustrated in FIG. 1, the hole 22 is formed at one side of each of the gear shift units 20, 30, 40 and 50, and the console fixing pin 60, which is installed on the console surface 10 in an upright manner, penetrates the holes 22 of each of the gear shift units 20, 30, 40 and 50.

The console fixing pin 60 may be formed of a metallic member that is electrically connected with the gear shift units 20, 30, 40 and 50, and serves to supply electric power to the gear shift units 20, 30, 40 and 50, and to transmit operational signals, which are generated from the gear shift units 20, 30, 40 and 50, to the control unit that will be described below.

The console fixing pin 60 serves as an axis about which the gear shift units 20, 30, 40 and 50 are rotated, and although not illustrated, a cap or the like may be inserted at an upper end of the console fixing pin 60 so as to prevent the gear shift units 20, 30, 40 and 50 from being moved away from an upper portion of the console fixing pin 60.

The operating unit 70, which is operated by the operating button 16 installed on the center fascia 12 or the console surface 10 of the vehicle, is connected to one or more of the gear shift units 20, 30, 40 and 50 so as to rotate the gear shift units 20, 30, 40 and 50.

The operating unit 70 may be implemented in various manners such as a manner in which motors are connected to the gear shift units 20, 30, 40 and 50, respectively, so as to rotate the gear shift units 20, 30, 40 and 50, and a manner in which gears, which have different numbers of serrations, are connected to each other at one side of the gear shift units 20, 30, 40 and 50, and a motor is connected to one of the serrations of the gears connected with each other so as to rotate the gear shift units 20, 30, 40 and 50. In various embodiments, as will be specifically described below, a manner, in which the gear shift units 20, 30, 40 and 50 are mechanically connected to each other, and are rotated by rotating the fourth gear shift unit 50, is used.

The control unit 80, which is formed of a printed circuit board (PCB), is disposed on the lower portion of the console surface 10 of the vehicle, and the control unit 80 serves to receive operational signals sent from the gear shift units 20, 30, 40 and 50 through the console fixing pin 60, and to transmit the operational signals to the TCU of the vehicle.

As illustrated in FIGS. 2A and 2B, when the operating button 16 is operated, the gear shift units 20, 30, 40 and 50 are rotated to the outside of the center fascia 12 and then spread, and when the operation of the operating button 16 is stopped, the gear shift units 20, 30, 40 and 50 are sequentially stacked and accommodated inside the center fascia 12.

Figure 3:
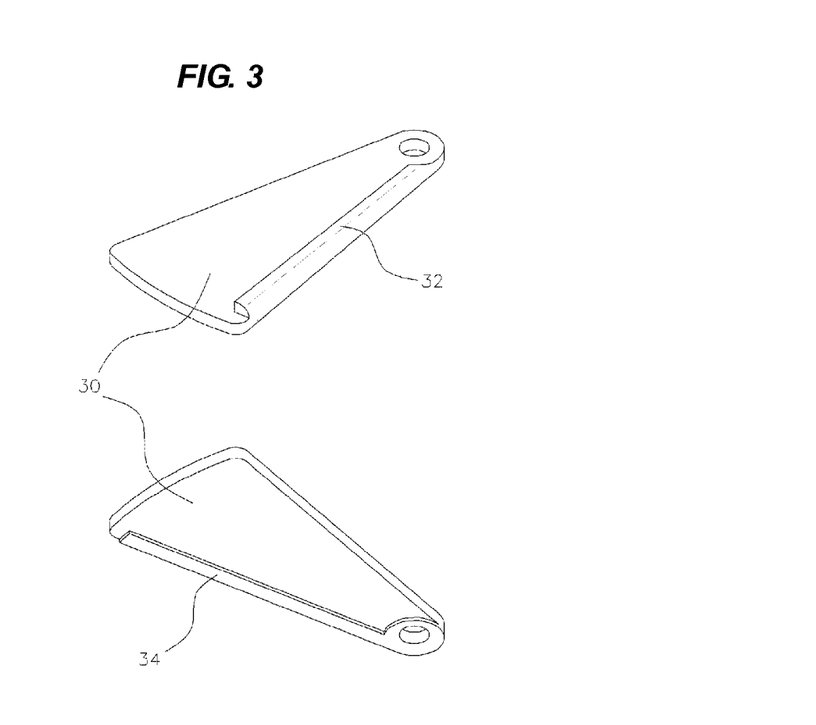
FIG. 3 is a perspective view illustrating appearances of an upper portion and a lower portion of a second gear shift unit in the exemplary folding fan type electronic shift lever according to the present invention.
Figure 4:
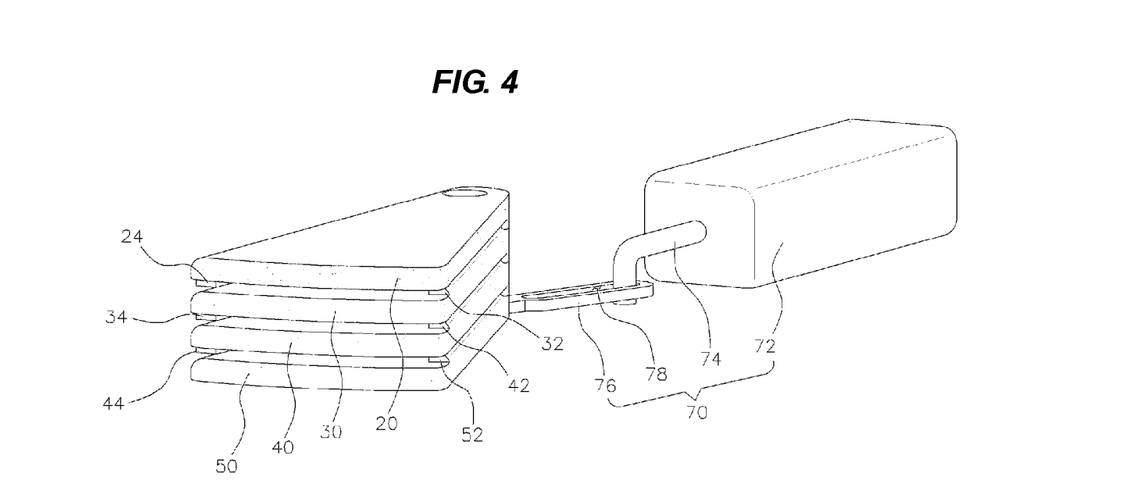
FIG. 4 is a perspective view illustrating appearances of first to fourth gear shift units and an operating unit in the exemplary folding fan type electronic shift lever according to the present invention.

FIG. 3 is a perspective view illustrating appearances of an upper portion and a lower portion of the second gear shift unit 30 according to various embodiments of the present invention, and FIG. 4 is a perspective view illustrating appearances of the gear shift units 20, 30, 40 and 50, and the operating unit 70 according to various embodiments of the present invention.

As illustrated in FIG. 3, a second lower protrusion 34 is elongated at one side (the left side in various embodiments) of the lower portion of the second gear shift unit 30, and a second upper protrusion 32 is elongated at the other side (the right side in various embodiments) of the upper portion of the second gear shift unit 30.

In a similar manner, a first lower protrusion 24 is formed at one side of a lower portion of the first gear shift unit 20, a third lower protrusion 44 is formed at one side of a lower portion of the third gear shift unit 40, a third upper protrusion 42 is formed at the other side of an upper portion of the third gear shift unit 40, and a fourth upper protrusion 52 is formed at the other side of an upper portion of the fourth gear shift unit 50.

The second upper protrusion 32 is disposed to be able to come into contact with the first lower protrusion 24, the third upper protrusion 42 is disposed to be able to come into contact with the second lower protrusion 34, and the fourth upper protrusion 52 is disposed to be able to come into contact with the third lower protrusion 44.

As illustrated in FIG. 4, the operating unit 70 may include a solenoid 72 which has a rod 74 that is moved forward and rearward as the operating button 16 is operated or the operation of the operating button 16 is stopped, and a rotary portion 76 which is formed integrally with one side of the fourth gear shift unit 50, and has a slot 78 formed therein.

An end of the rod 74 is bent at a predetermined angle, and accommodated in the slot 78 of the rotary portion 76, and the rotary portion 76 is rotated as the rod 74 slides in the slot 78 by the operation of the operating button 16.

Figure 5A:
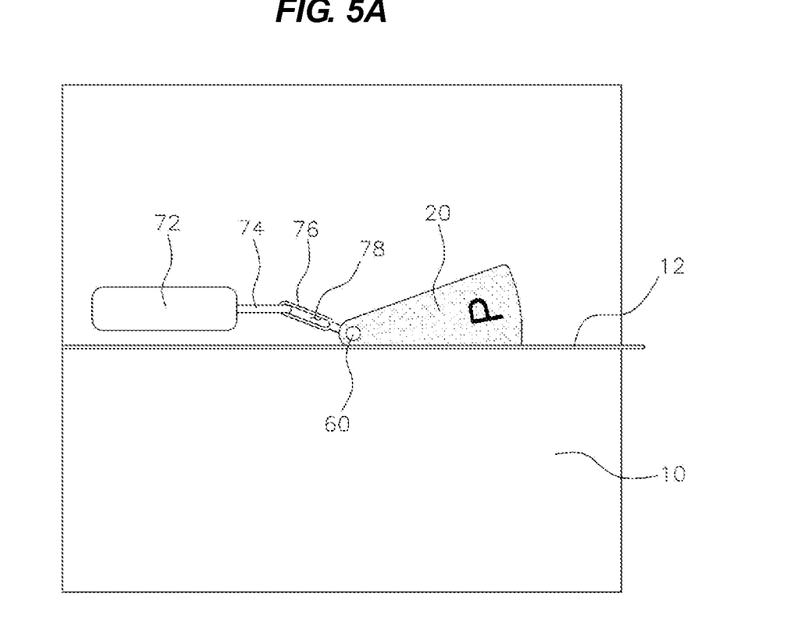
FIGS. 5A-5B are top plan views illustrating an operational process of the exemplary folding fan type electronic shift lever according to the present invention.
Figure 5B:
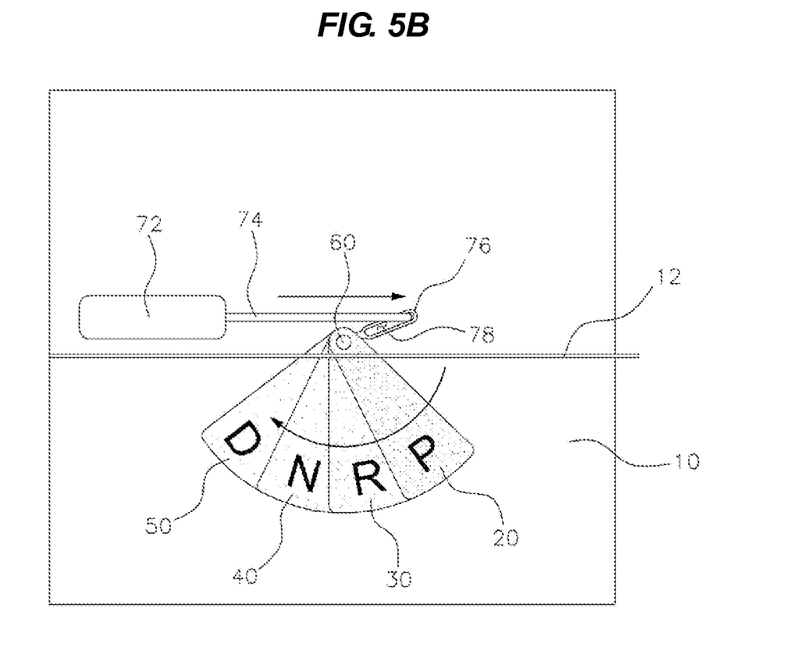

FIGS. 5A-5B are top plan views illustrating an operational process of the folding fan type electronic shift lever according to various embodiments of the present invention.

As illustrated in FIGS. 4, 5A and 5B, the gear shift units 20, 30, 40 and 50 are accommodated in the center fascia 12 at ordinary times, but the solenoid 72 is operated and the rod 74 protrudes when the driver drives the vehicle, and then the fourth gear shift unit 50 is rotated in a clockwise direction.

At this time, the fourth upper protrusion 52 formed on the fourth gear shift unit 50 is engaged with the third lower protrusion 44 so as to rotate the third gear shift unit 40, the third upper protrusion 42 is engaged with the second lower protrusion 34 as the third gear shift unit 40 is rotated such that the second gear shift unit 30 is rotated, and the second upper protrusion 32 is engaged with the first lower protrusion 24 as the second gear shift unit 30 is rotated such that the first gear shift unit 20 is rotated.

That is, the gear shift units 20, 30, 40 and 50 are sequentially spread in order of the fourth gear shift unit 50, the third gear shift unit 40, the second gear shift unit 30, and the first gear shift unit 20, and when all of the gear shift units 20, 30, 40 and 50 are completely spread, the first lower protrusion 24 and the second upper protrusion 32, the second lower protrusion 34 and the third upper protrusion 42, the third lower protrusion 44 and the fourth upper protrusion 52 are engaged with one another.

In various embodiments, all of the first lower protrusion 24, the second upper protrusion 32, the second lower protrusion 34, the third upper protrusion 42, the third lower protrusion 44, and the fourth upper protrusion 52 are elongated in a rectilinear bar shape, but may have various shapes such as a serrated shape, or a shape having a plurality of short bars, depending on the shapes of the gear shift units.

Figure 6A:
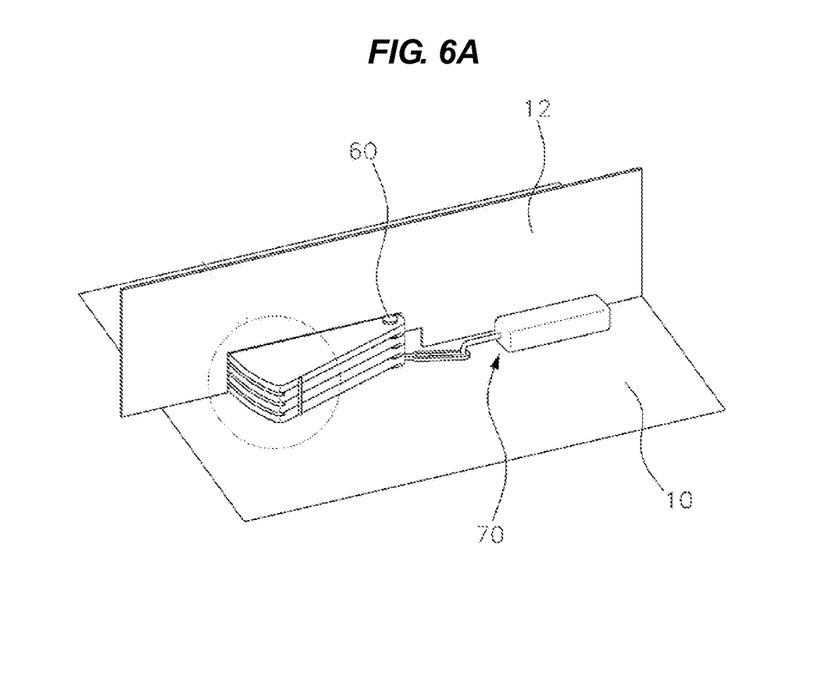
FIG. 6A is a perspective view illustrating appearances of the exemplary folding fan type electronic shift lever when viewed from the inside of the center fascia according to the present invention.
Figure 6B:
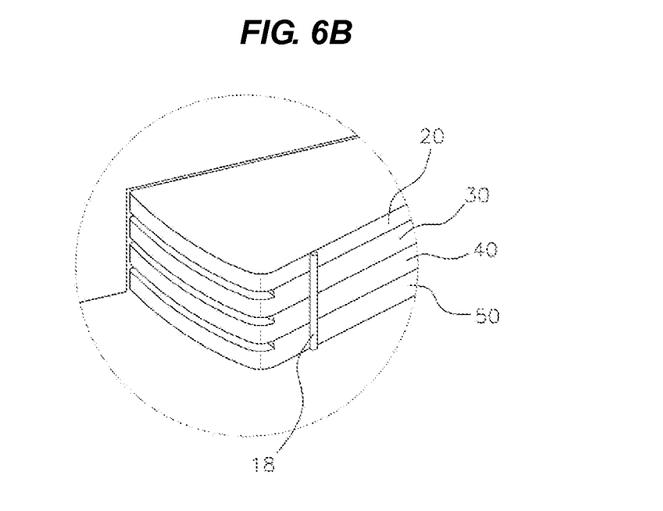
FIG. 6B is an enlarged view illustrating appearances of the exemplary folding fan type electronic shift lever when viewed from the inside of the center fascia according to the present invention.
Figure 7A:
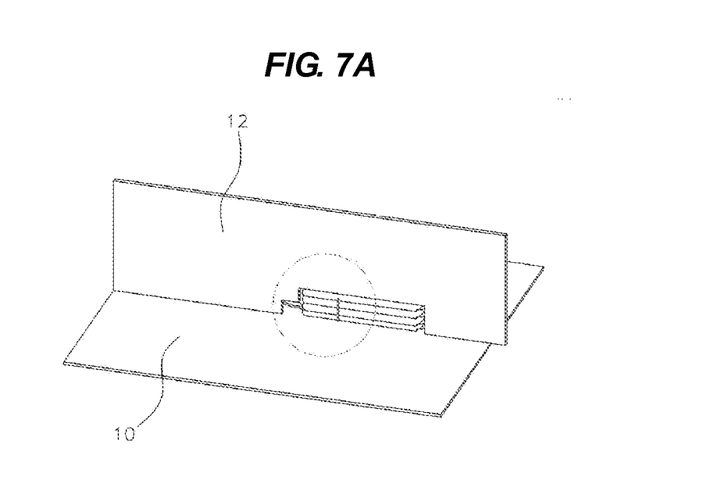
FIG. 7A is a perspective view illustrating appearances of the exemplary folding fan type electronic shift lever when viewed from the outside of the center fascia according to the present invention.
Figure 7B:
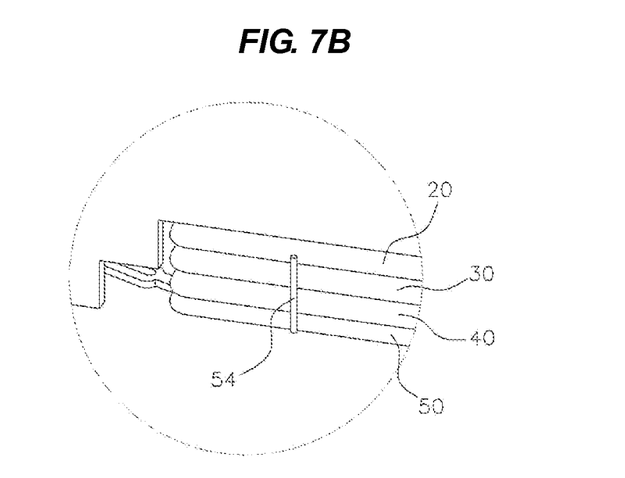
FIG. 7B is an enlarged view illustrating appearances of the exemplary folding fan type electronic shift lever when viewed from the outside of the center fascia according to the present invention.

FIGS. 6A and 6B are a perspective view and an enlarged view illustrating appearances of the folding fan type electronic shift lever according to various embodiments of the present invention when viewed from the inside of the center fascia 12, and FIGS. 7A-7B are a perspective view and an enlarged view illustrating appearances of the folding fan type electronic shift lever according various embodiments of the present invention when viewed from the outside of the center fascia 12.

As illustrated in FIGS. 6A-6B, a console supporting pin 18, which is configured to support the gear shift units 20, 30, 40 and 50, may be vertically installed on the console surface 10 inside the center fascia 12.

The console supporting pin 18 may be formed as a pin that is made of sufficiently robust plastic so as to support the gear shift units 20, 30, 40 and 50, and the console supporting pin 18 serves to prevent the gear shift units 20, 30, 40 and 50 from being spread to the inside of the center fascia 12.

The console supporting pin 18 may be installed to be spaced apart from the center fascia 12 at an interval, which corresponds to a width of the gear shift units 20, 30, 40 and 50, so that when the gear shift units 20, 30, 40 and 50 are accommodated in the center fascia 12, side surfaces of the gear shift units 20, 30, 40 and 50 may accurately match the opening portion 14 of the center fascia 12.

As illustrated in FIGS. 7A-7B, a gear shift unit supporting pin 54, which is configured to support the gear shift units 20, 30, 40 and 50, may be vertically installed at one side of the fourth gear shift unit 50.

Similar to the console supporting pin 18, the gear shift unit supporting pin 54 may also be formed as a pin that is made of robust plastic, and the gear shift unit supporting pin 54 serves to prevent the gear shift units 20, 30, 40 and 50 from being spread to the outside of the center fascia 12.

When the gear shift units 20, 30, 40 and 50 are folded in the reverse order of what is illustrated in FIGS. 5A-5B, the gear shift unit supporting pin 54 serves to sequentially press the first gear shift unit 20, the second gear shift unit, 30 and the third gear shift unit 40 and allow the gear shift units 20, 30, 40 and 50 to be stacked.

Figure 8:
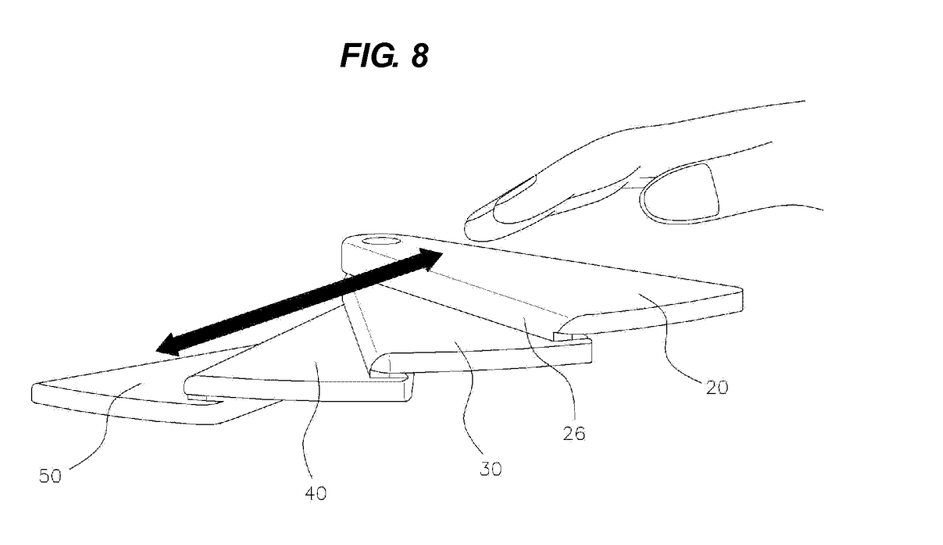
FIG. 8 is a use state view illustrating a use state of the exemplary folding fan type electronic shift lever according to the present invention.

FIG. 8 is a use state view illustrating a use state of the folding fan type electronic shift lever according to various embodiments of the present invention.

One side of the upper portion of each of the gear shift units 20, 30, 40 and 50 may be formed as an inclined surface having a predetermined angle or a curved surface 26 having a predetermined radius of curvature for the purpose of convenience in manipulation.

Since one side of each of the gear shift units 20, 30, 40 and 50 is formed as the inclined surface or the curved surface 26, the driver may conveniently manipulate the gear shift stage only by smoothly rubbing the gear shift units 20, 30, 40 and 50 using a finger.

When the angle of the inclined surface of each of the gear shift units 20, 30, 40 and 50 is smaller than 20°, an area of the gear shift unit which is occupied by the inclined surface becomes excessively great, and the driver can hardly feel the feeling of moderation when the driver manipulates the gear shift stage. When the angle of the inclined surface of each of the gear shift units 20, 30, 40 and 50 is greater than 45°, it is impossible to rub the gear shift units 20, 30, 40 and 50.

Therefore, in a case in which one side of each of the gear shift units 20, 30, 40 and 50 is formed as the inclined surface, the angle of the inclined surface of each of the gear shift units 20, 30, 40 and 50 may be 20° to 45°.

In a case in which one side of each of the gear shift units 20, 30, 40 and 50 is formed as the curved surface 26, when the radius of curvature of the curved surface 26 is greater than twice (2R) the thickness of each of the gear shift units 20, 30, 40 and 50, an area of the gear shift unit which is occupied by the curved surface 26 becomes excessively great, and the driver can hardly feel the feeling of moderation when the driver manipulates the gear shift stage. When the radius of curvature of the curved surface 26 is smaller than the thickness of each of the gear shift units 20, 30, 40 and 50, it is impossible to rub the gear shift units 20, 30, 40 and 50.

Therefore, in a case in which one side of each of the gear shift units 20, 30, 40 and 50 is formed as the curved surface 26, the radius of curvature may be one to two times as large as the thickness of each of the gear shift units 20, 30, 40 and 50.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A folding fan type electronic shift lever apparatus comprising:
   a plurality of gear shift units disposed on a console surface of a vehicle, and movable to an inside or an outside of a center fascia through an opening portion formed in the center fascia;
   a console fixing pin penetrating a hole formed at a side of each of the plurality of gear shift units to couple the plurality of gear shift units thereto, and fixedly installed on the console surface of the vehicle;
   an operating unit coupled to one or more gear shift units of the plurality of gear shift units, and operated by an operating button installed on the center fascia or the console surface of the vehicle to allow the plurality of gear shift units to be rotated about the console fixing pin; and
   a control unit being disposed on a side of the console surface of the vehicle, receiving operational signals sent from the plurality of gear shift units through the console fixing pin, and being configured to transmit the operational signals to a transmission control unit (TCU) of the vehicle,
   wherein the plurality of gear shift units are rotated to the outside of the center fascia and then spread when the operating button is operated, and the plurality of gear shift units are sequentially stacked and accommodated inside the center fascia when operation of the operating button is stopped.

2. The folding fan type electronic shift lever apparatus of claim 1,
wherein the plurality of gear shift units includes a first gear shift unit, a second gear shift unit, a third gear shift unit, and a fourth gear shift unit, and
wherein a first lower protrusion is formed at a side of a lower portion of the first gear shift unit, a second lower protrusion is formed at a side of a lower portion of the second gear shift unit, a second upper protrusion, which is disposed to come into contact with the first lower protrusion, is formed at another side of an upper portion of the second gear shift unit, a third lower protrusion is formed at a side of a lower portion of the third gear shift unit, a third upper protrusion, which is disposed to come into contact with the second lower protrusion, is formed at another side of an upper portion of the third gear shift unit, and a fourth upper protrusion, which is disposed to come into contact with the third lower protrusion, is formed at a side of an upper portion of the fourth gear shift unit.

3. The folding fan type electronic shift lever apparatus of claim 2, wherein the operating unit includes:
a solenoid coupled to a rod that is moved forward and rearward as the operating button is operated or the operation of the operating button is stopped; and
a rotary portion formed integrally with a side of the fourth gear shift unit, and having a slot formed therein, wherein an end of the rod is slidably accommodated in the slot of the rotary portion to rotate the fourth gear shift unit connected with the rotary portion, and the first, second and third gear shift units are rotated as the fourth gear shift unit is rotated.

4. The folding fan type electronic shift lever apparatus of claim 1, further comprising a console supporting pin vertically installed on the console surface inside the center fascia of the vehicle, and supporting the plurality of gear shift units, wherein the console supporting pin prevents the plurality of gear shift units from being spread to the inside of the center fascia when the plurality of gear shift units is accommodated in the center fascia.

5. The folding fan type electronic shift lever apparatus of claim 1,
wherein the plurality of gear shift units includes first, second, third and fourth gear shift units, and
wherein the folding fan type electronic shift lever apparatus further includes a gear shift unit supporting pin vertically installed at a side of the fourth gear shift unit, and supporting the first, second, third and fourth gear shift units, and the gear shift unit supporting pin prevents the plurality of gear shift units from being spread to the outside of the center fascia when the plurality of gear shift units is accommodated in the center fascia.

6. The folding fan type electronic shift lever apparatus of claim 1, wherein a side of an upper portion of each of the plurality of gear shift units is formed as an inclined surface having a predetermined angle or a curved surface having a predetermined radius of curvature.

7. The folding fan type electronic shift lever apparatus of claim 6, wherein the predetermined angle of the inclined surface of each of the plurality of gear shift units is between approximately 20° and approximately 45°.

8. The folding fan type electronic shift lever apparatus of claim 6, wherein the predetermined radius of curvature of the curved surface of each of the plurality of gear shift units is one to two times as large as a thickness of each of the plurality of gear shift units.

\* \* \* \* \*